(12) United States Patent
Piche et al.

(10) Patent No.: US 11,585,254 B2
(45) Date of Patent: *Feb. 21, 2023

(54) CLOSED CONTROL LOOP WITH AMMONIA SLIP AND NOX SENSOR FEEDBACK FOR USE IN SELECTIVE CATALYTIC REDUCTION SYSTEM

(71) Applicant: Catalytic Combustion Corporation, Bloomer, WI (US)

(72) Inventors: Daniel R. Piche, Eau Claire, WI (US); Benjamin R. Paffel, Eau Claire, WI (US); D. Todd Jacobs, Lago Vista, TX (US)

(73) Assignee: Catalytic Combustion Corporation, Bloomer, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,250

(22) Filed: Feb. 14, 2022

(65) Prior Publication Data

US 2022/0235683 A1 Jul. 28, 2022

Related U.S. Application Data

(63) Continuation of application No. 17/052,741, filed as application No. PCT/US2019/030903 on May 6, 2019, now Pat. No. 11,248,509.

(Continued)

(51) Int. Cl.
*F01N 3/20* (2006.01)
*F01N 3/10* (2006.01)
*F01N 13/00* (2010.01)

(52) U.S. Cl.
CPC ............. *F01N 3/208* (2013.01); *F01N 3/103* (2013.01); *F01N 13/008* (2013.01);
(Continued)

(58) Field of Classification Search
CPC ........ F01N 3/208; F01N 3/103; F01N 13/008; F01N 2560/021; F01N 2560/026;
(Continued)

(56) References Cited

U.S. PATENT DOCUMENTS

2010/0024393 A1 2/2010 Chi et al.
2010/0242440 A1* 9/2010 Garimella .......... B01D 53/9409
702/182

(Continued)

*Primary Examiner* — Brandon D Lee
(74) *Attorney, Agent, or Firm* — GableGotwals

(57) ABSTRACT

A selective catalytic reduction system control system (10) and method of its use include an ammonia ("$NH_3$") slip sensor (13) located within an interior space (27) of an exhaust stack (15) of a selective catalytic reactor (31), toward an inlet end (25) of the stack (15); a housing (17) located within the interior space of the exhaust stack; the housing including face panels 19; a nitrogen oxides ("NOx") sensor (11) contained within an interior space (29) defined by the face panels of the housing, at least two of the face panels ($19_I$, $19_O$) containing an oxidation catalyst; and a dosing controller (59) in communication with the $NH_3$ and NOx sensors, the dosing controller including a microprocessor with dosing logic embedded thereon. The housing with oxidation catalyst acts as a linear box, isolating the NOx sensor from $NH_3$ slip, linearizing the NOx sensor signal.

3 Claims, 6 Drawing Sheets

Related U.S. Application Data

(60) Provisional application No. 62/667,017, filed on May 4, 2018.

(52) U.S. Cl.
CPC .. *F01N 2560/021* (2013.01); *F01N 2560/026* (2013.01); *F01N 2610/02* (2013.01); *F01N 2900/14* (2013.01); *F01N 2900/16* (2013.01)

(58) Field of Classification Search
CPC ............. F01N 2610/02; F01N 2900/14; F01N 2900/16; F01N 2560/14; F01N 3/2066; F01N 3/101; Y02A 50/20; Y02T 10/12; Y02T 10/40
See application file for complete search history.

(56) References Cited

U.S. PATENT DOCUMENTS

| | | |
|---|---|---|
| 2011/0072798 A1 | 3/2011 | Herman |
| 2012/0258015 A1 | 10/2012 | Ren et al. |
| 2013/0074817 A1 | 3/2013 | Fisher et al. |
| 2015/0165377 A1 | 6/2015 | Schroeder et al. |
| 2018/0112582 A1 | 4/2018 | Okamoto et al. |

\* cited by examiner

CLOSED CONTROL LOOP WITH AMMONIA SLIP AND NOX SENSOR FEEDBACK FOR USE IN SELECTIVE CATALYTIC REDUCTION SYSTEM

CROSS-REFERENCE TO RELATED APPLICATIONS

This United States application is a continuation of U.S. application Ser. No. 14/052,741 filed Nov. 3, 2020 which is a National Phase of PCT Application No. PCT/US2019/030903 filed May 6, 2019, which claims priority to U.S. Provisional Patent Application No. 62/667,017 filed May 4, 2018, each of which is incorporated herein by reference.

BACKGROUND

This disclosure is in the field of selective catalytic reduction ("SCR") systems configured to treat exhaust steams from an engine, boiler, or other process with ammonia. More particularly, the disclosure relates to control systems intended to control a rate of ammonia injection into a reactor of a SCR system.

Emission standards for non-road diesel engine emissions have been increasingly tightened through the years, and currently diesel engines must meet the U.S. federal emission standards referred to as EPA Tier 4. In addition, the State of California via the California Air Resources Board recently proposed even more strict Tier 5 or "Near Zero" emissions standards, concentrating on particulate matter ("PM"), nitrogen ("NOx"), reactive organic gas ("ROG"), greenhouse gas ("GHG"), carbon monoxide ("CO"), and non-methane hydrocarbons ("NMHC") emitted from locomotive and marine diesel engines. Diesel particulate matter is comprised of about 80% unburned diesel fuel, referred to as the soluble oil fraction, and elemental carbon particles. To date, DPM control has primarily focused on engineering improvements to the engines. However, the cost and availability of the improvements has not met industry needs, leading to other solutions like exhaust after-treatment.

Diesel exhaust after-treatment solutions include oxidation catalysts and diesel particulate filters or wire meshes. The solutions also include selective catalytic reduction ("SCR"), an active emissions control technology that injects a liquid-reductant agent through or over a selective catalyst surface and into the exhaust stream of the diesel engine. The reducing agent converts to ammonia ("$NH_3$") that reduces nitrogen oxides ("NOx") into nitrogen, water, and carbon dioxide, which are then exhausted from the exhaust duct or pipe. Typically, the liquid-reductant agent is an automotive-grade urea known as diesel exhaust fluid ("DEF"). For emission standards requiring no more than 5 ppm or 10 ppm NOx, or in applications requiring high reduction efficiency, the SCR system is the most cost-effective way to achieve the standards.

An SCR system includes three main components: a controlled injection system for the reagent or DEF, a mixing duct to mix the reagent with the engine exhaust, and a catalyst reactor where the reduction reaction occurs. Current available DEF injection control systems use either a NOx sensor or an ammonia ("$NH_3$") slip sensor, but not both sensors. Many of these control systems are expensive and require complex and dedicated analyzers and sensor calibration and maintenance. The systems also require sampling probes and sampling lines. If excess DEF is injected, then $NH_3$ slip occurs.

Use of NOx sensors only has experienced mixed results because the NOx sensor is affected by strong $NH_3$ slip bias. The NOx sensor internals read $NH_3$ slip in the exhaust gas stream as NOx, but not in a linear manner or in any predictable way that can be corrected with a bias algorithm or a mathematical transfer function.

SUMMARY

In embodiments of this disclosure, a selective catalytic reduction ("SCR") closed loop control system includes dual feedback sensors, one for nitrogen oxides ("NOx") and another for ammonia ("$NH_3$") slip. The $NH_3$ slip sensor reading provides an accurate and precise bias correction value in real time to the NOx sensor reading. The sensors may be automotive-style sensors and may be installed so they sample directly from the stack without the need for sampling probes or sampling lines. In embodiments, the sensors are mounted transverse to the exhaust flow through the stack.

In embodiments, a selective catalytic reduction system control loop includes an $NH_3$ slip sensor located within an interior space of an exhaust duct or stack of an SCR reactor and a NOx sensor housing that serves as a sensor tunnel or slipstream assembly. Both sensors should be located at the same stream location. The stack is wide enough to allow for the location of two ports, for example, athwart (traverse) from the flow direction. In a square duct, the sensors may be located on the same wall of the stack but do not have to be located on the same wall. In some embodiments, the $NH_3$ sensor may be upstream or downstream of the NOx sensor, depending of the application. This is to adapt to the addition of specific catalyst bed (e.g., oxidation, formaldehyde, other) for custom emission control requirements. For example, the NOx sensor may be located downstream or upstream and on a same or different side of the stack or adjacent to the $NH_3$ slip sensor. Regardless of side or location relative to the $NH_3$ sensor, exhaust flow passes through the housing. The housing includes face panels that surround and isolate NOx sensor contained within an interior space defined by the face panels. Two of the face panels, one on an inlet flow side of the box and another on the outlet flow side, contain an oxidation catalyst.

The housing with the oxidation catalysts linearizes the NOx sensor signal. Essentially housing with the oxidation catalysts acts as a linear amplifier, a linear response, a linear regression, a linear equation, or their equivalents, making the NOx sensor's signal linear, behaving as a straight line or slope when graphed. The housing when configured in this way, therefore, may be referred to as a "linear box." With the linear box, the NOx sensor signal (the input) is always truly proportional to the real NOx value measured in the exhaust stack and because the signal slope is a straight line, the NOx measurement is simple to perform and accurate. Without this linearization, the NOx sensor is sending a signal that is not proportional to real NOx value. The non-linearized signal is truly aberrant (at fault and therefore not capable of consistent bias correction) and indicates a NOx value far from the real NOx value in the stack.

The $NH_3$ slip sensor and the NOx sensor may be installed so that they sample directly from the exhaust stack without the need for sampling lines and probes. In some embodiments, the sensors are mounted to one side of the stack. The sensors should be mounted transverse to the exhaust flow through the stack. The sensors may include a controller area network ("CAN") bus connector. The linear box may be sized to handle or accommodate no more than 10%, no more than 5%, and no more than 1% of the total exhaust flow through the stack.

Embodiments of an SCR closed loop control system of this disclosure may be used in connection with emissions control of natural gas and diesel reciprocating lean burn engines, and as a retrofit to existing emissions control systems. The control system may also be used with, or retrofitted to, an SCR system used to treat the exhaust of reciprocating engines, turbines, boilers, and burners fed by various types of fossil fuels including natural gas, diesel, dual fuel, biofuels, waste gas, and other fossil or chemical fuels. The control system may be used in connection with these engines, turbines, boilers, or burners in marine, on-road, non-road, and aircraft transportation applications, electrical power generation applications, and torque generation applications (e.g. gas compression and oil rigs).

The control loop of this disclosure may be used in an SCR system configured to reduce NOx, carbon monoxide ("CO"), non-methane hydrocarbons ("NMHC"), non-methane, non-ethane hydrocarbons ("NMNEHC"), diesel hydrocarbons ("HC"), diesel particulate matter ("DPM"), or some combination thereof. The SCR system may be configured to achieve a predetermined emission standard such as, but not limited to, EPA Tier 3, Tier 4, and other existing emission standards and projected standards that will be promulgated within the foreseeable future to achieve nonroad emissions targets.

In embodiments the selective catalytic reduction system control loop includes $NH_3$ slip sensor located within an interior space of an exhaust stack of a selective catalytic reactor, toward an inlet end of the stack; and a housing located within the exhaust stack, downstream and adjacent to the $NH_3$ slip sensor; the housing including face panels and a NOx sensor contained within an interior space defined by the face panels, at least two of the face panels containing an oxidation catalyst. The housing with the oxidation catalyst serves as a linear box. The box may be connected to an interior wall of the exhaust stack. The sensors are mounted athwart (traverse) to the flow direction The box may be located within the stack and sized to accommodate a portion of the total exhaust flow through the stack. In some embodiments, the box is sized to accommodate no greater than 10% of total exhaust flow through the exhaust stack, no greater than 5% of total exhaust flow through the exhaust stack, or no greater than 1% of total exhaust flow through the exhaust stack, there being other upper-bound discrete values and subranges within this broader range. One of the two face panels containing the oxidation catalyst is located toward an inlet flow side of the box and another of the two face panels containing the oxidation catalyst is located toward an outlet flow side of the box.

In embodiments, the system and method of this disclosure eliminates expensive, complex, and dedicated analyzers and sensors, sampling probes, and sampling lines. The $NH_3$ slip sensor and the NOx sensor may include a controller area network bus connector. Both the $NH_3$ slip sensor and the NOx sensors may be mounted transverse to a longitudinal axis of the exhaust stack. The NOx sensor is fitted in a port of the box. The NOx sensor reading may equal the NOx real value plus the $NH_3$ slip real value, where the NOx real value equals the NOx sensor reading less the $NH_3$ sensor reading.

The control loop and system may be part of a diesel emission reduction system that includes one or more of the following features:

- means to reduce DPM such as a diesel particulate filter ("DPF") of a kind known in the art, or a diesel oxidation trap catalyst ("DOTC")
- a dosing system to precisely meter a liquid-reductant agent such as diesel exhaust fluid ("DEF") into an injection duct of a SCR system; and
- mixing elements configured to create a homogeneous mixture of $NH_3$ in the exhaust stream prior to an SCR catalyst.

A SCR system is designed to reduce NOx. With both sensors, embodiments of this disclosure are compensating for engine raw NOx emission variation and engine load swings. The closed loop controller of this disclosure keeps the NOx real (process value) at the stack, stable, flatlined, and very close to a predetermined "NOx set point." The higher NOx measurement accuracy developed by the pair of sensors makes the closed loop more accurate and more stable than prior art systems and methods. By consequence, it also keeps the $NH_3$ slip to a very low value, almost zero. Also, during commissioning, fine tuning of the closed loop proportional-integral-derivative ("PID") parameters, for optimum control stability. Without a $NH_3$ real value, the closed loop PID tuning would be more difficult and will take much longer to execute.

DEFINITIONS

Figure 1:
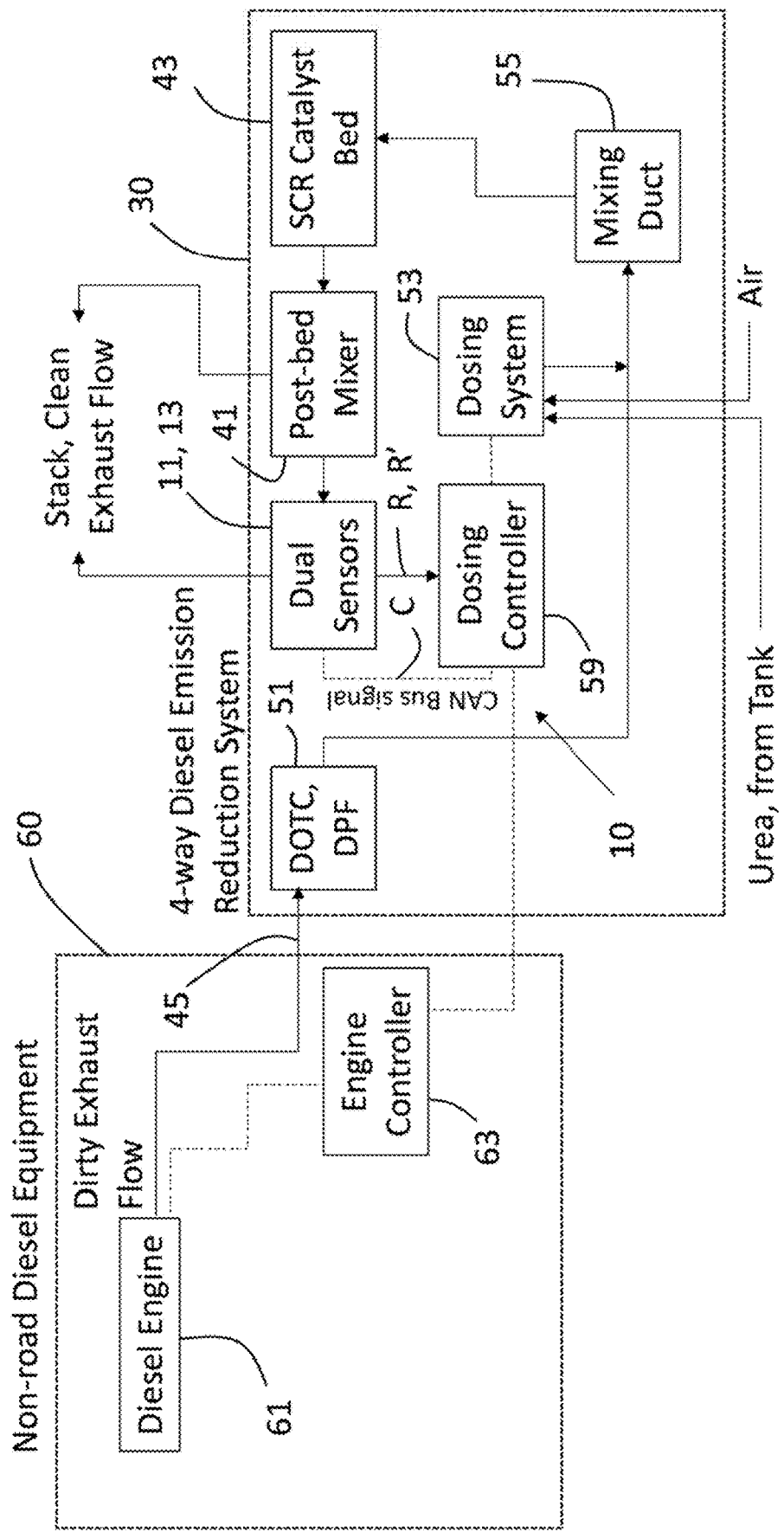
FIG. 1 is a schematic of an embodiment of a selective catalytic reduction ("SCR") closed loop control system of this disclosure. The system includes dual feedback sensors, one for nitrogen oxides ("NOx") and another for ammonia ("$NH_3$") slip

For the purpose of this disclosure, a "linear box" is a housing that acts as a sensor tunnel or slipstream assembly, permitting an exhaust flow through it, and containing a NOx sensor and including oxidation catalysts that isolate the sensor from NH₃ slip flowing in the exhaust stack containing the housing. The housing with the oxidation catalyst acts as a linear amplifier, a linear response, a linear regression, a linear equation, or their equivalents, making the NOx sensor's signal linear and behaving as a straight line or slope when graphed.

DETAILED DESCRIPTION

Referring to the drawings, embodiments of a selective catalytic reduction ("SCR") closed loop control system 10 of this disclosure includes dual feedback sensors 11, 13, one for nitrogen oxide ("NOx") and another for ammonia ("NH₃") slip. The sensors 11, 13 are located at the stack 15, downstream of a selective catalytic reduction ("SCR") catalyst bed, with the NOx and NH₃ sensors 11, 13 providing information to control the injection of a liquid-reductant agent to the SCR system. The NOx sensor 13 is housed within a housing 17 that isolates it from the total exhaust flow through the stack but permits a portion of that total exhaust flow to flow through the housing 17. The housing 17, which is not a completely closed structure, may be thought of as a sensor tunnel or slipstream assembly. In some embodiments, the liquid-reductant agent may be DEF. The ammonia needed for NOx reduction comes from the decomposition of the urea solution or from aqueous ammonia that is injected and evaporated within an exhaust duct, pipe, or reactor. In embodiments, both sensors 11, 13 can be located toward in inlet end 25 of an exhaust stack 15 of an SCR reactor 31. The NH₃ slip sensor 13 reading provides an accurate and precise bias correction value in real time to the NOx sensor 11 reading.

In embodiments, the control loop 10 includes an NH₃ slip sensor 13 located within an interior space 27 of an exhaust stack 15 of an SCR reactor 31 and a housing 17 containing the NOx sensor 11. Both sensors 11, 13 should be located at the same stream location. The stack 15 is wide enough to allow for the location of two ports 14, 27, for example, athwart (traverse) from the exhaust flow direction. In a square stack 15 the sensors 11, 13 may be located on the same wall 45 of the stack 15 but do not have to be located on the same wall. In some embodiments, the NH₃ sensor 13 may be upstream or downstream of the NOx sensor 22, depending of the application. This is to adapt to the addition of specific catalyst bed (e.g., oxidation, formaldehyde, other) for custom emission control requirements. The housing 17 may be located upstream or downstream and on a same or different side of the stack 15 as the NH₃ slip sensor 13, adjacent to the NH₃ slip sensor 13. The housing 17 may include one or more oxidation catalyst panels 19 that surround and isolate the NOx sensor 11 that is contained within an interior space 29 of the housing 17 defined by the face panels 19. Other walls 35 of the box may be solid walls. A flange 33 may be used to mount the box 17 to a sidewall 45 of the stack 15. The sensor 11 may be inserted into the housing 17 through a port 27. The housing 17 may be any shape preferable, for example, a square- or rectangular-shaped box. In other embodiments, the housing 17 is sized and shaped appropriate to a stack 15 having a circular-shaped cross section.

The housing 17 with the oxidation catalysts linearizes the NOx sensor signal. Essentially, the housing 17 with the oxidation catalysts acts as a linear amplifier, a linear response, a linear regression, a linear equation, or their equivalents, making the NOx sensor's signal linear, behaving as a straight line or slope when graphed. The housing 17 when configured in this way, therefore, may be referred to as a "linear box." With the linear box, the NOx sensor 11 signal (the input) is always truly proportional to the real NOx value measured in the exhaust stack 15 and because the signal slope is a straight line, the NOx measurement is simple to perform and accurate. Without this linear box 17, the NOx sensor 11 is sending a signal that is not proportional to real NOx value. The non-linearized signal is truly aberrant (at fault and therefore not capable of consistent bias correction) and indicates a NOx value far from the real NOx value in the stack. The NH₃ sensor 13 may also be in communication with signal processing means 73 or may be sent directly to the dosing controller 59.

The NOx and NH₃ sensors 11, 13 may be automotive-style sensors similar in size to an automotive vehicle's oxygen sensor and connectable to computer processing means by way of a controller area network ("CAN") bus. For purposes of this disclosure, an automotive-style sensor is a sensor including a CAN bus connection. The sensors 11, 13 should be installed so that they sample directly from the exhaust stack without the need for sampling probes or sampling lines, thereby avoiding issues like sample line plugging and NOx value averaging. In some embodiments, the sensors 11, 13 are mounted toward the same side of the stack 15. In other embodiments, the sensors 11, 13 may be mounted on different sides of the stack 15. The sensors 11, 13 may be oriented in a sideway direction relative to the stack, that is, mounted transverse to a direction of exhaust flow through the stack 15 For example, the sensors 11, 13 may be oriented parallel to a lateral axis 12 of the stack 15, the exhaust flow being perpendicular to the longitudinal axis 16 of the exhaust stack 15. the linear box 17 being oriented so exhaust flows through the panels $19_I$, $19_O$.

The exhaust flow may be flowing upward or downward or, for that manner, in any other direction, and a smaller portion of this total exhaust flow is flowing through the linear box 17. By way of a non-limiting example, the linear box 17 may be sized to handle or accommodate no more than 10%, no more than 5%, and no more than 1% of the total exhaust flow through the stack 15. By way of a non-limiting example, if the total exhaust flow is 14,000 actual cubic feet per minute ("ACFM") (about 396 cubic meters per minute), then the exhaust flow going through the linear box 17 may be range from 140 to 1,400 ACFM. Another non-limiting example would be for a larger exhaust flow of 50,000 actual cubic feet per minute ("ACFM") (about 1416 cubic meters per minute), where the exhaust flow through the linear box 17 could be in the range from 500 to 5,000 ACFM.

Because the exhaust gas stream flowing through the stack 15 may still contain NH₃ slip in addition to the NOx, the panels 19 include oxidation catalysts of a kind known in the art to minimize (or eliminate completely) the NOx sensor's exposure to NH₃. Any NH₃ slip flowing through the oxidation catalyst panels 19 is converted to NOx. The oxidation catalyst panels 19 perform this function by converting NH₃ to NOx in a ratio of about one mole NH₃ to one mole NOx. Therefore, the NOx sensor is continually reading NOx and is never exposed to any ammonia molecules.

One oxidation catalyst panel 19I may be arranged toward the inlet side 21 of the linear box 17 and another of the panels 19O may be located toward the outlet side 23, with the NOx sensor 11 located in between. The inlet side oxidation catalyst panel 19I is doing most of the NH₃ conversion, with the outlet side oxidation catalyst panel 19O providing an outlet 29 of the box 17. For example, depending on the main exhaust flow condition and flow dynamics in the stack 15, one of the panels 19 may be arranged as a bottom panel or face of the box 17 and the other as a top panel or face, with the NOx sensor 11 located in between and equidistant from each panel 19. In a low flow condition, the flow may be inverted downward.

Because of this arrangement, the NOx sensor reading is:

$$\text{NOx sensor reading} = \text{NOx real value} + \text{NH}_3 \text{ slip real value} \quad \text{(Eq. 1)}$$

Because the $NH_3$ slip sensor 13 is located outside of the box 17, the sensor 13 is reading a real (true) value for the $NH_3$ slip in the exhaust gas stream with no bias to other molecules. In other words, the $NH_3$ slip sensor 13 may be used to make an accurate and precise bias correction value in real time to the NOx sensor 11 reading. Therefore, $$\text{NOx real value} = \text{NOx sensor reading} - \text{NH}_3 \text{ sensor reading} \quad \text{(Eq. 2)}$$

In embodiments, this real value is used by the injection control/dosing system for adjusting the injection of the reagent such as DEF.

Figure 2:
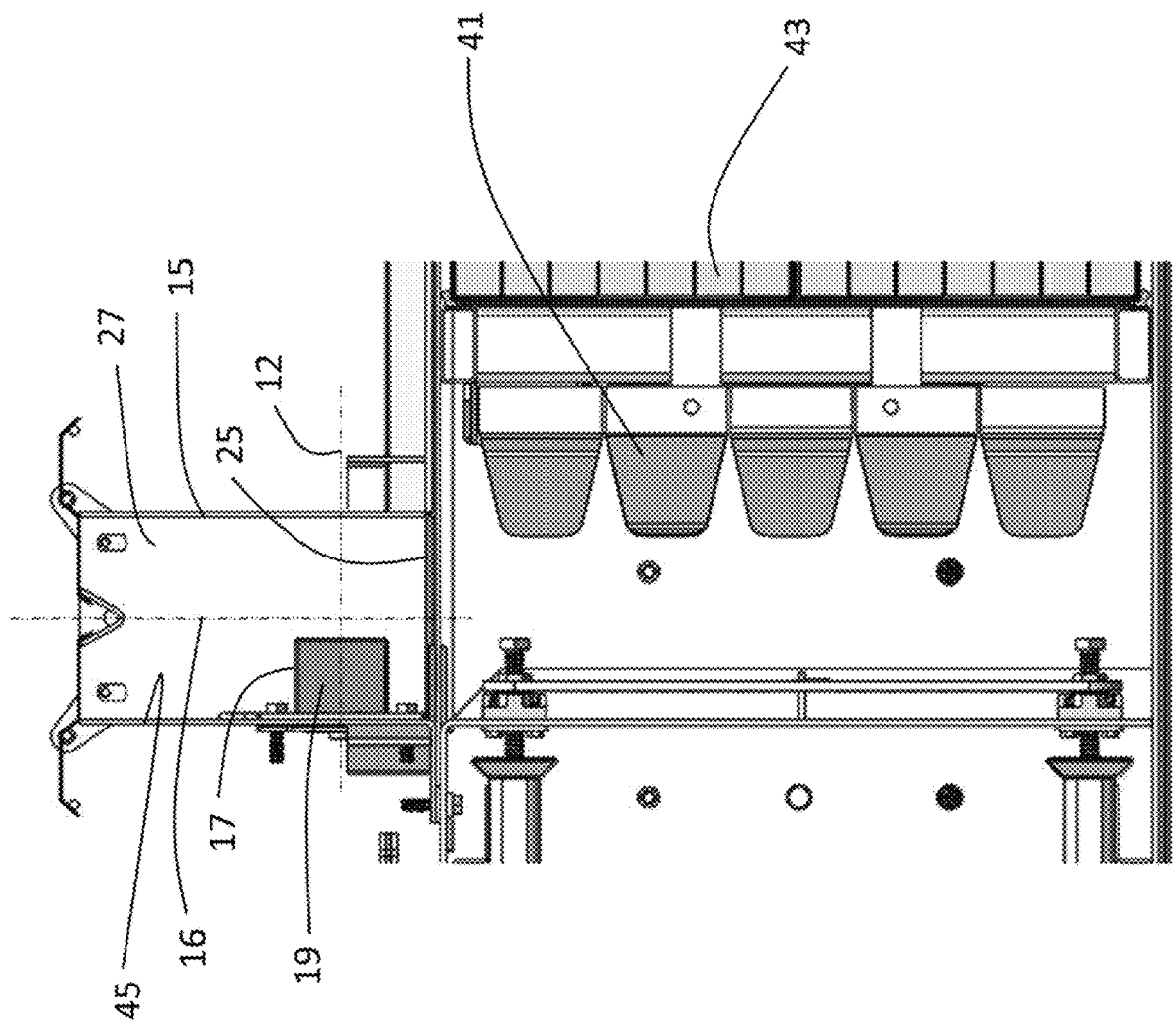
FIG. 2 shows an embodiment of a stack of an SCR reactor including a housing ("box") with oxidation catalysts located inside the stack and housing a NOx sensor, thereby isolating the sensor from any $NH_3$ slip flowing through the stack. Essentially the housing with the oxidation catalysts is acting as a linear amplifier, a linear response, a linear regression, a linear equation, or their equivalents, making the NOx sensor's signal linear and behaving as a straight line or slope when graphed. The housing, therefore, may be referred to as a "linear box." The sensors are in communication with a controller. The mixing blades located downstream of an SCR catalyst bed remix all molecules just upstream of a NOx sensor and a $NH_3$ slip sensor. This lowers variation in sensor readings and improves accuracy and precision of both sensors' readings.
Figure 3:
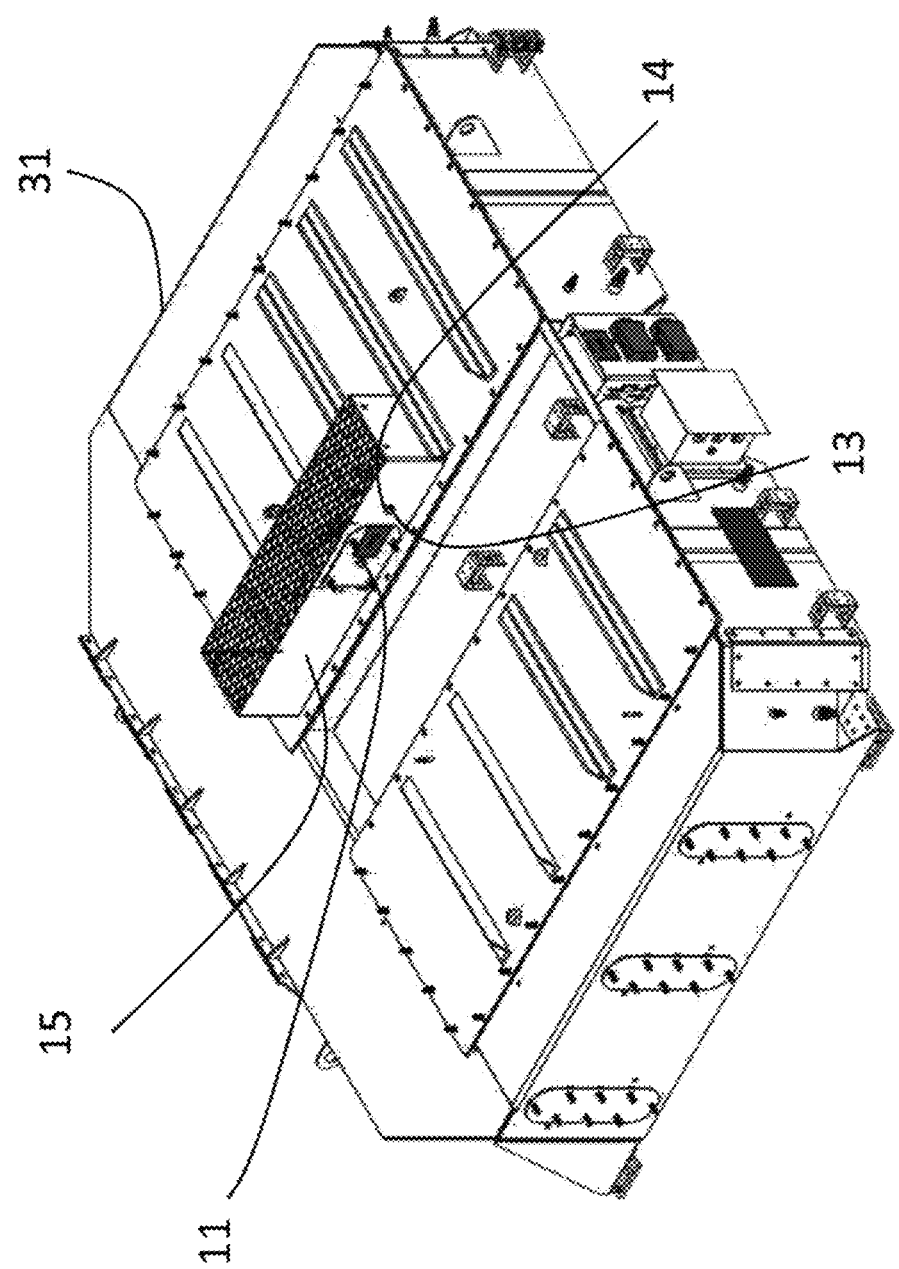
FIG. 3 is an isometric view of SCR reactor of FIG. 2. The NOx sensor is located inside the box. The $NH_3$ sensor is located adjacent to the linear box and within the stack.

In embodiments, static mixers 41 may be located downstream of the SCR catalyst 43, see FIG. 2, but upstream of the stack 15 to mix the exhaust gas stream molecules out of the SCR NOx reduction process. This additional mixing process feeds the linear box 17 and stack 15 with an exhaust gas stream containing a low root-mean-square ("RMS") deviation of NOx and $NH_3$ content. Therefore, the NOx and $NH_3$ slip sensors 11, 13 experience less variability. The mixing quality achieved, as measured by RMS deviation for the NOx and $NH_3$ concentration, may be less than 3%, and may be in a range or 0.25% to 2.75%, there being discrete values and subranges within the broader range of 0.25% to 3%. In some embodiments, the RMS deviation is no greater than 1%. The low RMS deviation helps stabilize the proportional-integral-derivative ("PID") loop feedback process and eliminates the need for sampling probes. The measured NOx and $NH_3$ slip values are more representative of the whole exhaust gas stream in real time.

In embodiments of a SCR closed loop control system of this disclosure a programmable logic controller ("PLC"), or its equivalent, including software residing in ladder logic with PID function may be used to perform the logic functions and mathematics required, and a human-machine interface may be provided for setup and operation of the control system. The software may incorporate features and functions such as, but not limited to, characteristic liquid-reductant agent curves, set point control at various engine loads, injection permissive logic, NOx value correction of $NH_3$ bias, auxiliary functions (e.g. data logging, alarm management, remote access management). Other forms of electronic computation and control may be used. For example, one or more controllers of the system and method may use a microprocessor and associated software.

In embodiments, the SCR closed loop control system receives signals from the NOx and $NH_3$ slip sensors; an analog signal input from an engine indicating the engine load, the fuel flow, or some combination of the two; and an analog signal output from a PLC controlling the injection of the liquid-reductant agent. Injection may occur through one or more injection lances 54 configured to inject the urea or ammonia into a mixing duct of the SCR system. The box 17 may include a stack configuration that can be adapted for a round or a rectangular or square-shaped stack 15. The downstream mixers 41 can be adaptable to various SCR cross-sections and include a compact flow axis space requirement.

In embodiments, the control system 10 may be used with a diesel emission reduction system 30 that include one or more of the following features: means 51 to reduce DPM such as a diesel particulate filter ("DPF") of a kind known in the art, a diesel oxidation trap catalyst ("DOTC") like that disclosed in PCT/US19/13433 to Catalytic Combustion Corp., or some combination of the two; a dosing system 53 to precisely meter a liquid-reductant agent such as diesel exhaust fluid ("DEF") into an injection duct of a SCR system; and a mixing duct 55 and post-bed mixer 41 each including static mixers configured to create a homogeneous mixture of $NH_3$ in the exhaust stream prior to an SCR catalyst bed 43. The closed-loop dosing control system 10 includes a controller 59 and the $NO_x$ and $NH_3$ concentration sensors 11, 13 (which may include a controller area network ("CAN") bus connector C) arranged to prevent cross-interference of the NOx sensor 11 by excess $NH_3$ in the exhaust stream. Engine exhaust from a non-road diesel engine 60 is routed through the diesel emission control system 30 where the diesel emissions are converted to nitrogen, water vapor and $CO_2$.

Figure 4:
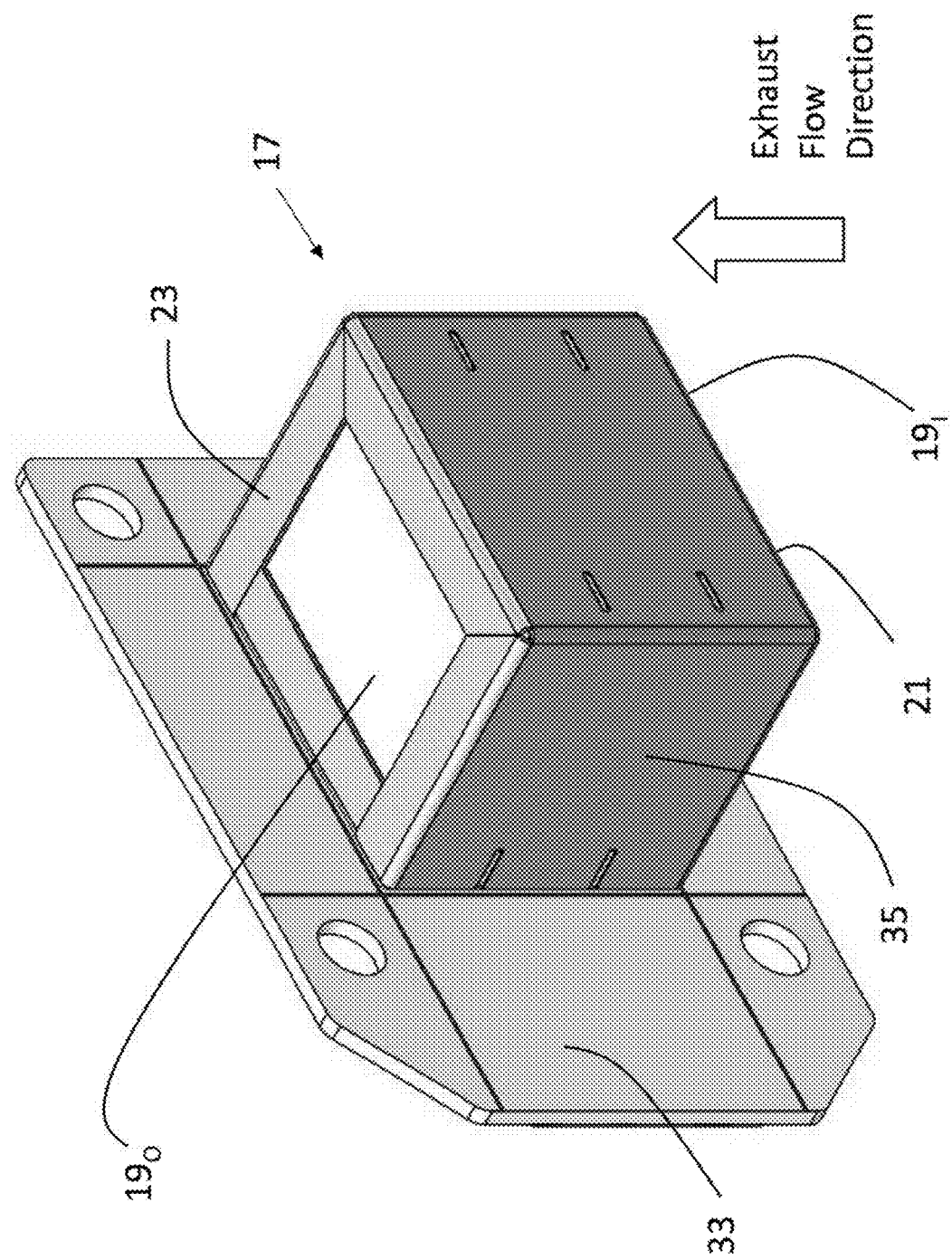
FIG. 4 is an isometric view of the box of FIG. 2. Oxidation catalyst panels are located at the top and bottom, thereby isolating the NOx sensor from $NH_3$ slip.
Figure 5:
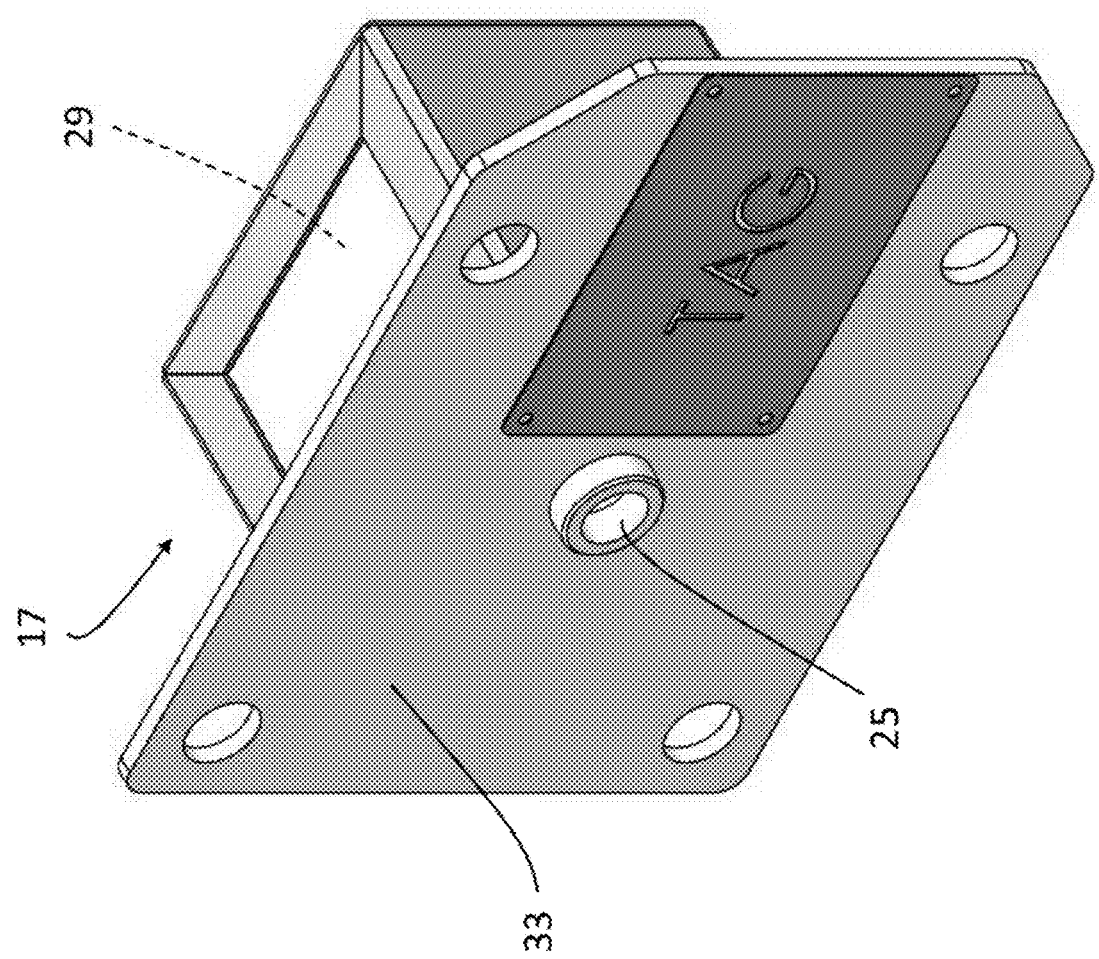
FIG. 5 is an isometric view of the box of FIG. 4. The linear box includes a NOx sensor port arranged so the sensor lies in between the top and bottom oxidation catalyst panels. Exhaust flow may be reversed in some applications as may the orientation of the box to accommodate a horizontal exhaust flow.
Figure 6:
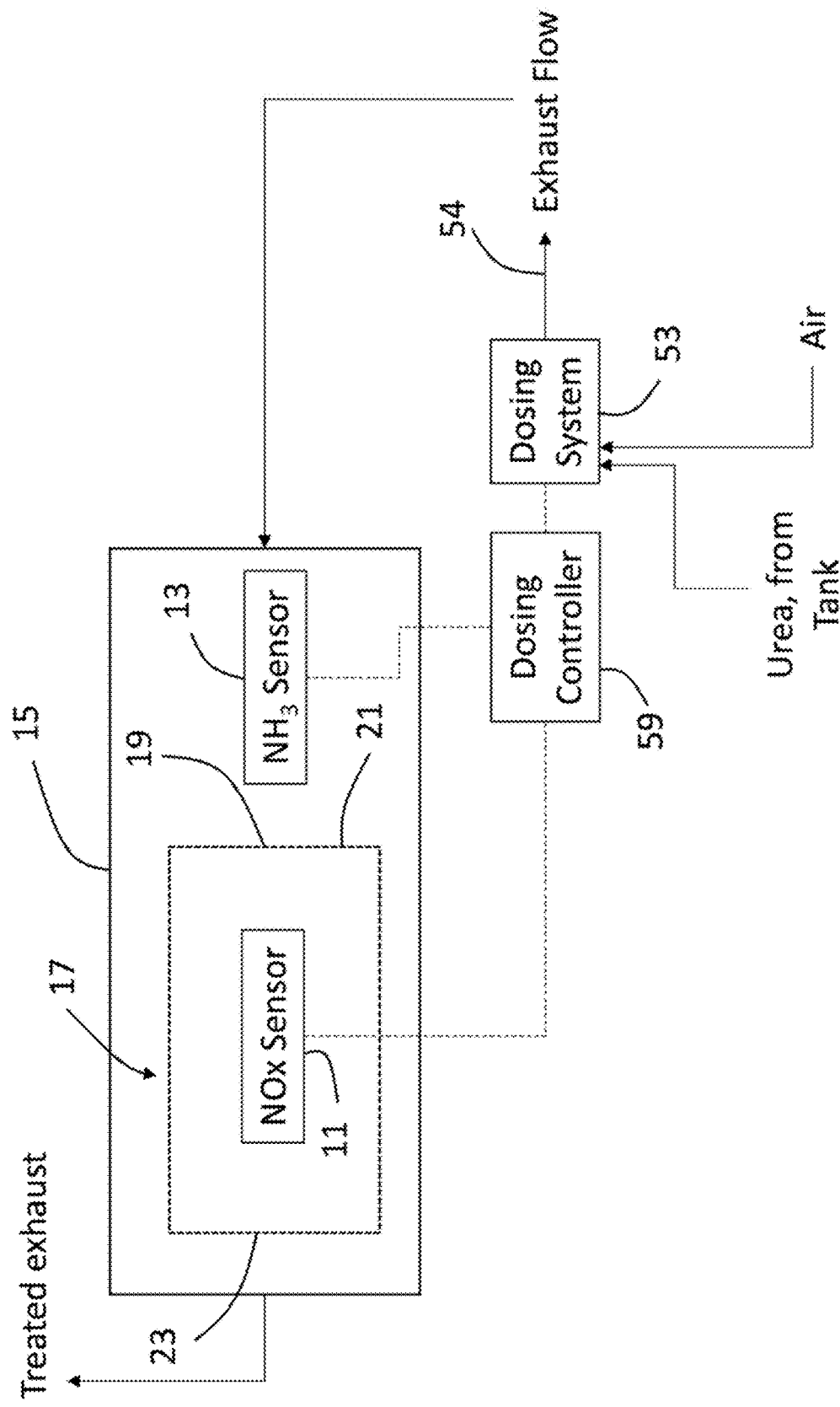
FIG. 6 is a schematic of an embodiment of a dual sensor system of this disclosure. The sensors are located in the exhaust stack. The housing with the oxidation catalysts linearizes the NOx sensor signal.

The closed loop dosing control system 10 controls the amount of liquid-reductant agent or DEF that is metered into the exhaust stream via a targeted $NO_x$ value, utilizing the $NO_x$ concentration sensor 11 to sense the amount of $NO_x$ in the exhaust stream. Oxidation catalyst panels 19, see e.g. FIGS. 4 & 5, protect or isolate the NOx concentration sensor 11 to prevent $NH_3$ cross interference. The $NH_3$ sensor 13 is used to detect excess $NH_3$ in the exhaust stream. The sensors 11, 13 are coupled to control logic which ensures extremely precise metering of the DEF into the exhaust stream. The engine control system 20 and the dosing controller 59 communicate so that the emission control system 30 will precisely inject the agent, such as DEF, appropriately based upon engine operation. Other agents of a kind known in the art may be used where appropriate.

Embodiments of a method of controlling a dosing system (53) of a selective catalytic reduction system (30) configured for use with a non-road diesel engine (60) includes the following steps:

obtaining a sensor reading (R) indicating a concentration of ammonia in an exhaust stream of the non-road diesel engine by way of an ammonia ("$NH_3$") slip sensor (13) located within an interior space (27) of an exhaust stack (15) of a selective catalytic reactor (31), toward an inlet end (25) of the stack (15);

obtaining another sensor reading (R') indicating a concentration of nitrogen oxides in the exhaust stream by way of a nitrogen oxides ("NOx") sensor (11) contained within a housing (17) located within the interior space of the exhaust stack; the housing including face panels (19) defining an interior space (29) of the housing, at least two face panels ($19_I$, $19_O$) containing an oxidation catalyst;

sending said sensor readings to a dosing controller (59) in communication with the $NH_3$ and NOx sensors, the dosing controller including a microprocessor with dosing logic embedded thereon;

the dosing controller;

receiving the sensor readings and calculating a NOx real value and a $NH_3$ slip real value. wherein NOx sensor reading=NOx real value+$NH_3$ slip real value; and wherein NOx real value=NOx sensor reading−$NH_3$ sensor reading; and the dosing controller adjusting an amount of liquid reduction agent being injected into the exhaust stream in response to the NOx real value and the NH₃ slip real value.

While embodiments of a SCR closed loop control system have been described, the control system and method of its use are capable of modification by persons of ordinary skill in the art without departing from the scope of this disclosure. The claims include the full range of equivalents to which each recited element is entitled.

The invention claimed is:

1. A selective catalytic reduction system control system (10) comprising:
   an ammonia ("NH₃") slip sensor (13) located within an interior space (27) of an exhaust stack (15) of a selective catalytic reactor (31);
   a nitrogen oxides ("NOx") sensor (11) contained within the interior space (27), the NOx sensor isolated from NH₃ slip within the exhaust stack and located downstream of the NH₃ slip sensor; and
   a dosing controller (59) in communication with the NH₃ slip sensor and NO$_x$ sensor, the dosing controller including non-transitory machine-readable storage medium containing dosing logic executable by the dosing controller;
   wherein the dosing logic corrects sensor readings sent to it by the NOx sensor by sensor readings sent to it by the NH₃ slip sensor;
   wherein the sensor readings of the NH₃ slip sensor are real values of NH₃ slip; and
   wherein the dosing logic adjusts an amount of liquid reduction agent being injected into an exhaust stream based upon the corrected NOx readings.

2. A method of controlling a dosing system (53) of a selective catalytic reduction system (30) configured for use with a diesel engine (60), the dosing system including a dosing controller (59) in communication with an-ammonia ("NH₃") slip sensor (13) located within an interior space (27) of an exhaust stack (15) of a selective catalytic reactor (31) and a nitrogen oxides ("NOx") sensor (11), the NOx sensor isolated from NH₃ slip within the exhaust stack and located downstream of the NH₃ slip sensor, the dosing controller including a non-transitory machine-readable storage medium executable by the dosing controller, the method comprising:
   obtaining sensor readings from the NH₃ slip sensor indicating a concentration of ammonia in an exhaust stream of the diesel engine;
   obtaining sensor readings from the NOx sensor indicating a concentration of nitrogen oxides in the exhaust stream;
   correcting the sensor readings of NOx by using the sensor readings of NH₃ by calculating a NOx real value and a NH₃ slip real value, wherein NOx sensor reading=NOx real value+NH₃ slip real value, the NH₃ slip real value being the NH₃ sensor reading, and wherein NOx real value=NOx sensor reading−NH₃ sensor reading; and
   adjusting an amount of liquid reduction agent being injected into exhaust stream of the diesel engine in response to the NOx real value.

3. Non-transitory machine readable storage medium containing dosing logic executable by a dosing controller (59) for controlling a dosing system (53) of a selective catalytic reduction system (30) configured for use with a diesel engine (60), the dosing logic comprising:
   obtaining sensor readings indicating a concentration of ammonia in an exhaust stream of the diesel engine by way of an ammonia ("NH₃") slip sensor (13) located within an interior space (27) of an exhaust stack (15) of a selective catalytic reactor (31);
   obtaining sensor readings indicating a concentration of nitrogen oxides in the exhaust stream by way of a nitrogen oxides ("NOx") sensor (11), the NOx sensor isolated from NH₃ slip within the exhaust stack and located downstream of the NH₃ slip sensor;
   correcting the sensor readings of NOx by using the sensor readings of NH₃ by calculating a NOx real value and a NH₃ slip real value, wherein NOx sensor reading=NOx real value+NH₃ slip real value, the NH₃ slip real value being the NH₃ sensor reading, and wherein NOx real value=NOx sensor reading−NH₃ sensor reading; and
   adjusting an amount of liquid reduction agent being injected into exhaust stream of the diesel engine in response to the NOx real value.

* * * * *